April 29, 1958   J. H. CROSS, JR., ET AL   2,832,422

TUBING HANGER

Filed May 26, 1954

INVENTORS.
Jonathan H. Cross Jr.,
Holland R. Hunter,
BY
John J. Schneider
ATTORNEY.

United States Patent Office 2,832,422
Patented Apr. 29, 1958

2,832,422
TUBING HANGER

Jonathan H. Cross, Jr., Odessa, and Holland R. Hunter, Midland, Tex., assignors, by mesne assignments, to Esso Research and Engineering Company, Elizabeth, N. J., a corporation of Delaware Application May 26, 1954, Serial No. 432,509

7 Claims. (Cl. 166—216)

The present invention is directed to a tubing hanger. More particularly, the invention is directed to apparatus for anchoring a tubing in a well casing. In its more specific aspects, the invention is directed to a tension-type tubing hanger which may be set and released easily.

The present invention may be briefly described as a tubing hanger which comprises a tubular mandrel which is adapted to be connected into a tubing string. The tubular mandrel is provided with a cage which is mounted thereon and releasable connecting means are provided for connecting the cage to the tubular mandrel for limited movement of the tubular mandrel relative to the cage. The cage is provided with means, such as drag bars, for holding the cage against movement with respect to the tubular mandrel. Pipe gripping means, such as pipe slips, are arranged on the cage for engagement with the interior wall of a casing. The pipe gripping means are connected to the cage by slip arms defining an eccentric or cam surface. The slip arms are provided with a biasing means, such as a spring, embracing the slip arms and normally urging the pipe slips into a restrained or inoperative position. A collar is arranged on the mandrel vertically spaced apart from the cage having an ellipsoidal or cam surface engageable with the eccentric surface on the slip arm for expanding the pipe slips for engagement with the inner wall of the casing.

The upper end of the tubular mandrel defines at least one recessed space which is designed to engage with a latching means provided on the upper end of a sleeve releasably connected to the tubular mandrel and arranged between the cage and the tubular mandrel.

The collar is releasably connected to the tubular mandrel by a frangible means, such as a shear pin, and the sleeve is also releasably attached to the tubular mandrel by a frangible means, such as a shear pin.

The releasable connecting means connecting the cage to the sleeve and tubular mandrel comprises a slot in the cage and a lug on the sleeve such that on rotation of the tubular mandrel and sleeve relative to the cage the tubular mandrel and sleeve may be moved vertically with respect to the cage which is held against movement by the drag bars.

The invention will be further illustrated by reference to the drawing in which.

Figure 1:
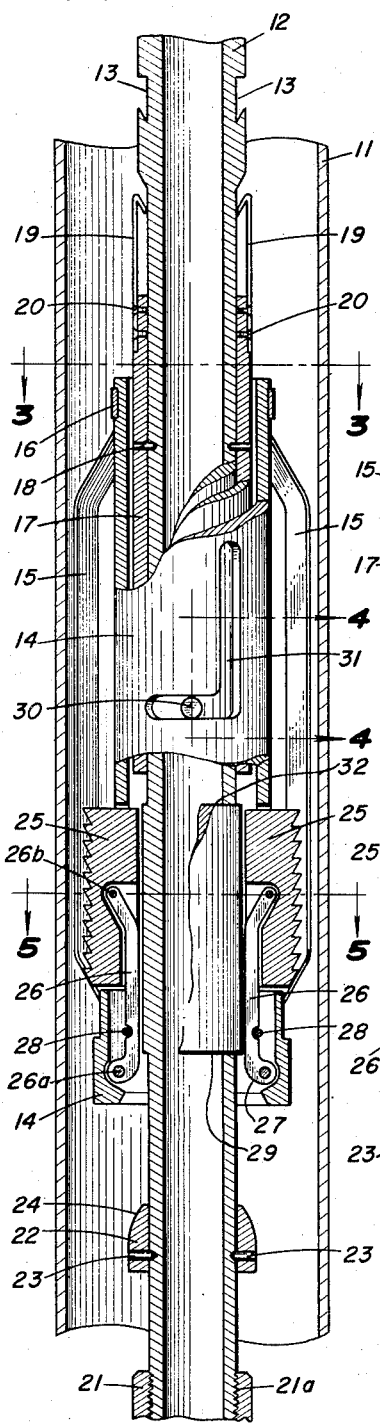
Fig. 1 is a partly sectional view of the apparatus in inoperative position.
Figure 2:
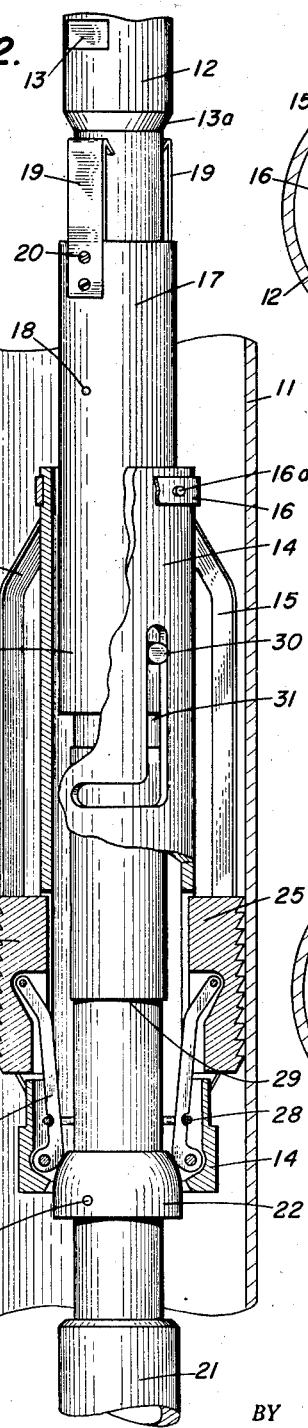
Fig. 2 is a similar view to Fig. 1 with the apparatus in operative position.
Figure 3:
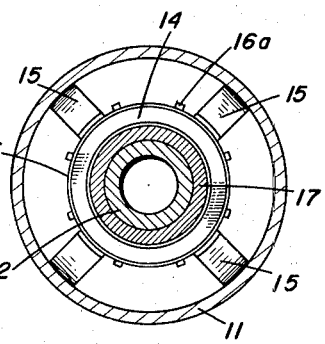
Fig. 3 is a sectional view taken along lines 3—3 of Fig. 1.
Figure 4:
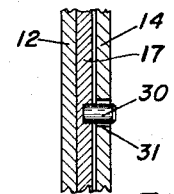
Fig. 4 is a sectional view taken along the lines 4—4 of Fig. 1.
Figure 5:
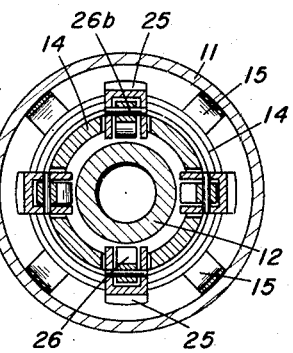
Fig. 5 is a sectional view taken along the lines 5—5 of Fig. 1.

Referring now to the drawing in which identical numerals will be employed to designate identical parts, numeral 11 designates a well casing in which the apparatus of the present invention is designed to be arranged. A tubular mandrel 12 which is adapted to be connected into a tubing string defines with its upper end a recess 13 and has a cage 14 arranged thereon. The cage 14 is provided with drag bars or springs 15 which are connected to the cage 14 by means of bands 16 to which the drag bars 15 are attached. Bands 16 are connected to the cage 14 by screws 16a. Arranged between the cage 14 and the tubular mandrel 12 is an inner sleeve 17 which is releasably connected to the tubular mandrel by a frangible means, such as shear pins 18. The lower end of sleeve 17 is positioned above shoulder 32 of mandrel 12 a sufficient distance to permit fracture of shear pin 18 before shoulder 32 engages the lower end of sleeve 17.

The upper end of the sleeve 17 is provided with a plurality of latching means 19 which serve as a spring catch to engage with the recess 13. The spring catch or latching means 19 are connected to the sleeve 17 by means of screws 20.

The lower end of the mandrel 12 is provided with a stop means 21 which suitably may be a collar connecting the tubular mandrel 12 to the lower end of the tubing string, not shown. Arranged on the tubular mandrel 12 vertically spaced apart from the cage 14 is a collar or expander ring 22 which is releasably connected to the mandrel 12 by a frangible means, such as shear pins 23. The exterior surface of the collar 22 defines an ellipsoidal or cam surface 24, the function of which will be described in more detail hereinafter.

Pivotally connected to the lower end of the cage are a plurality of pipe engaging means or slips 25 which are designed to expand into engagement with the interior wall of the well casing 11. The pipe slips 25 are connected to the lower end of the cage 14 by means of slip arms 26 which have an eccentric or cam surface 27 operatively engageable with the ellipsoidal or cam surface 24 of the collar 22. Slip arms 26 are pivotally mounted on pivots 26a. Embracing the lower end of the slip arms 26 is a circular or garter spring 28 which normally urges the slip arms 26 inwardly to hold the slips 25 in an inoperative position.

The tubular mandrel has a shoulder 29 which is adapted to engage with the collar 22.

Arranged on the sleeve 17 is a lug 30 which is adapted to move in a J-slot 31 in the cage 14.

The present invention operates in the following manner:

The tool is made up in the tubing string at the desired point and run into the hole until the depth is reached where the hanger is to be set. The tool is rotated to the left to bring the lug 30 into position to allow the sleeve 17 and the mandrel 12 to be picked up with respect to the cage. The drag bars hold the cage 14 motionless while the collar or expander ring 22 is drawn up by the movement of the pipe string to allow the cam surfaces 24 and 27 to come into contact. The slip arms rotate on the slip arm retaining pins 26a to move the pipe slips 25 outwardly into engagement with the wall or casing 11. The cam surface 27 is so shaped as to allow approximately 30 degree rotation of the slip arms 26 on pins 26a as the expander ring 22 with the surface 24 contacts the cam surface 27. The wedging action of the ring or collar 22 against the eccentric surface 27 results in approximately 2:1 advantage while the difference in length of the force arms results in a maximum of 4:1 disadvantage. Thus, overall the force exerted by the slips on the walls of the casing may be approximately one-half the drag furnished by the drag bars. Once the slips 25 bite initially into the casing, additional upward pull applied to the tubing string will serve to make the slips bite more deeply into the inner wall of the casing. The surface 24 of the collar 22 is ellipsoidal and so designed that a line drawn through the pin 26a and the point of contact of the eccentric surface 27 and the surface 24 is normal (or as close to normal as is possible) to the tangent of the expander ring 22 at that point of contact. Hence, the majority of the force applied through the slip arm 26 will be directed against the expander ring 22 rather than against the pin 26a. Thus the expander ring or collar 22 engages the slip arms 26 which serve to expand the slips.

The present invention allows the tool to be released once it is set. If the surfaces 24 and 27 on the collar 22 and slip arms 26, respectively, are too tightly wedged or if for other reasons release of collar 22 is prevented when it is attempted to lower the tubing string connected to mandrel 12 upward force may be applied by lifting up on the pipe string to which the mandrel 12 is connected to shear the pins 23 which will allow the collar or ring 22 to drop down. Once the collar 22 has been removed from contact with the arms 26, the spring 28 will serve to retract the slips from engagement with the wall of the casing. However, if the teeth of slips 25 are embedded sufficiently in casing 11 to prevent spring 28 from retracting the slips 25, mandrel 12 may be reciprocated to jar the slips. Thus downward movement of mandrel 12 causes lug 30 to move to the lower end of slot 31 thereby urging cage 14 and connected slips 25 downwardly, which action aids in disengaging the slips 25 from the casing 11 to permit spring 28 to retract the slips. Also after collar 22 has dropped to stop collar 21, upward movement of mandrel 12 causes lug 30 to move to the upper end of slot 31 thereby urging cage 14 and connected slips 25 upwardly, which action also aids in disengaging slips 25.

If the collar or expander ring 22 should fail to drop downwardly on the mandrel 12 out of engagement with the slip arm 26, it is possible to force the expander ring or collar 22 downwardly by reciprocation. In such operation, upward pull on the mandrel 12 will serve to shear the shear pins 18 releasing the sleeve 17 from the mandrel 12. This permits the tubing string into which the hanger is connected to be reciprocated a distance equal to the distance between the shoulder 29 and the stop collar 21 less the thickness of collar 22. When reciprocated downward movement of mandrel 12 will drive shoulder 29 against the collar or ring 22 thereby causing ring 22 to slide downwardly to the stop 21.

The distance between the shoulder 29 and the collar 21 may be about two feet less than the length of the cage 14 so that the tubular mandrel will always be inside the cage 14. If the device of the present invention does not release on the first reciprocation, the tubing may be raised and reciprocated again the distance equal to the distance between the collar 21 and the shoulder 29 less the thickness of collar 22 until release of collar 22 is obtained. If the slips fail to release on release of collar 22, the tubing may be slacked off thereby moving mandrel 12 downwardly. This causes surface 13a to engage and impart a downward force to the sleeve 17. Since the cage 14 and the sleeve 17 are connected by the J-slot 31 and lug 30, downward motion imparted to the sleeve 17 by surface 13a will carry the cage 14 downward and unseat the slips 25.

The recesses 13 may comprise two in number and may be diametrically opposed, each an arc about 60° in width.

The distance between the surface 13a and the lower end of the recesses 13 may be less than the length of the latch 19 so that latches 19 may jump out of the recesses 13 when the tubing string is completely slacked off. If more than one downward jar is required to unset slips 25 and if in lowering the tubing string latches 19 engage recesses 13, the tubing string may be raised, rotated 90° and lowered clear of recesses 13.

After the slips 25 are unseated, the procedure may be reversed if the latch 19 did not engage the recesses 13 that is, the tubing string may be rotated 90° and lowered in order to engage recesses 13 when the tubing string is raised. These recesses provide auxiliary means for removing the cage and sleeve from the borehole although shoulder 32 of mandrel 12 affords means for removing this apparatus and preventing sleeve 17 and attached cage 14 from riding down on the mandrel to engage collar 22.

It will be seen from the foregoing description taken with the drawing that the present invention comprises a tension-type tubing hanger which may be positively set and released without difficulty. In the past, such tension-type anchors have been difficult to move because it was impossible to return the releasable connecting means to the J-slots. With compression-type tubing anchors, there has been a tendency of the anchors to "creep" up the casing wall with continued reversals of fluid load in pumping wells. Furthermore, compression-type anchors have tended to cause "corkscrewing" or bending in the tubing string.

The present invention is of considerable utility, therefore, since it eliminates the difficulties with compression-type anchors and also eliminates the difficulties in the prior art tension-type anchors. In each case with the device of the present invention, a positive release of the slips is obtainable to allow the hanger to be pulled from the hole.

The present invention may be employed in any type of tubing and may be suitably sized without departing from the spirit and scope of the invention for the various types of tubing and for the various types of casing.

It is important that the exterior surface of the collar or expander ring 22 be made ellipsoidal in cross section to engage with the cam surface 27. The ring 22 may be held to the mandrel 12 approximately 5 inches above the collar 21 by four shear pins which may be, in normal use, sheared at about 20,000 pounds. It is preferred, however, that the individual pins be made to shear at 7500 pounds, plus or minus 500 pounds allowing the operator a shearing range of 7500 to 30,000 pounds by inserting any number from 1 to 4 shear pins. The collar or ring 22 should have a slidable smooth fit on the mandrel 12 for movement downwardly thereon as described.

While only one J-slot and lug has been shown, it is preferred that the apparatus be provided with two J-slots and lugs, each of the lugs being approximately one inch in diameter and capable of withstanding shock loads of 20,000 pounds.

The apparatus may be provided such that the tubular mandrel is threaded and will be made up into the collar 21 by mating threads 21a. Likewise, the tubular mandrel 12 will be threadably connected by means not shown into the tubing string at the upper end.

The nature and objects of the present invention having been completely described and illustrated, what we wish to claim as new and useful and to secure by Letters Patent is:

1. A tubing hanger which comprises, in combination, a tubular mandrel adapted to be connected into a tubing string, a cage mounted on said tubular mandrel, releasable connecting means connecting said cage to said tubular mandrel for limited movement of said tubular mandrel relative to said cage, means for holding said cage against movement with respect to said tubular mandrel, pipe slips arranged on said cage for engagement with the inner wall of a casing, slip arms connected to said slips and to said cage, said slip arms being provided with an eccentric surface, and means arranged on said mandrel spaced from said cage having an ellipsoidal surface engageable with said eccentric surface for expanding said pipe slips into engagement with the inner wall of said casing on upward movement of said tubular mandrel.

2. A tubing hanger which comprises, in combination, a tubular mandrel adapted to be connected into a tubing string, a cage mounted on said tubular mandrel, releasable connecting means comprising a slot and a lug connecting said cage to said tubular mandrel for limited movement of said tubular mandrel relative to said cage, drag means on said cage for holding said cage against movement with respect to said tubular mandrel, pipe slips arranged on said cage for engagement with the inner wall of a casing, slip arms connected to said slips and to said cage, said slip arms being provided with an eccentric surface, and a collar arranged on said mandrel vertically spaced apart from said cage having an ellipsoidal surface engageable with said eccentric surface for expanding said pipe slips into engagement with the inner wall of said casing on upward movement of said tubular mandrel.

3. A tubing hanger which comprises, in combination, a tubular mandrel provided with a recess on an upper end and adapted to be connected into a tubing string, an inner sleeve releasably connected to said tubular mandrel, latch means connected to said sleeve engageable with said recess for holding said hanger in inoperative position when removing said hanger from a well casing, a cage mounted on said inner sleeve and said tubular mandrel, releasable connecting means comprising a slot in said cage and a lug on said inner sleeve connecting said cage to said sleeve and said tubular mandrel for limited movement of said tubular mandrel relative to said cage, drag bars for holding said cage against movement with respect to said tubular mandrel, pipe slips for engagement with the inner wall of said casing, slip arms connected to said slips and to said cage, said slip arms being provided with a cam surface, a spring embracing said slip arms and normally urging said pipe slips into a retracted position, and a collar arranged on said mandrel spaced from said cage having a cam surface engageable with the cam surface on the slip arms for expanding said pipe slips into engagement with the inner wall of said casing on upward movement of said tubular mandrel.

4. A tubing hanger which comprises, in combination, a tubular mandrel adapted to be connected to a tubing string, a cage mounted on said tubular mandrel, releasable connecting means comprising a slot and a lug connecting said cage to said tubular mandrel for limiting movement of said tubular mandrel relative to said cage, drag means on said cage for holding said cage against movement with respect to said tubular mandrel, pipe slips arranged on said cage for engagement with the inner wall of the casing, slip arms connected to said slips and to said cage, said slip arms being provided with an eccentric surface, a first collar arranged on said mandrel spaced from said cage having an ellipsoidal surface engageable with said eccentric surface for expanding said pipe slips into engagement with the inner walls of said casing on upward movement of said tubular mandrel, frangible means connecting said mandrel and said first collar adapted to fracture on upward movement of said mandrel to permit relative slidable movement between said mandrel and said first collar, and a second collar connected to said mandrel for movement therewith and spaced from said first collar adapted to provide a stop for said first collar.

5. A tubing hanger which comprises, in combination, a tubular mandrel adapted to be connected into a tubing string, a cage mounted on said tubular mandrel, releasable connecting means comprising a slot and a lug connecting said cage to said tubular mandrel for limited movement of said tubular mandrel relative to said cage, drag bars on said cage for holding said cage against movement with respect to said tubular mandrel, pipe slips arranged on said cage for engagement with the inner wall of a casing, slip arms connected to said slips and to said cage, said arms being provided with a cam surface, a first collar arranged on said mandrel spaced from said cage having a cam surface engageable with the cam surface on the slip arms for expanding said pipe slips to engage with the inner wall of said casing on upward movement on said tubular mandrel, frangible pins connecting said mandrel and said first collar adapted to fracture on upward movement of said mandrel to permit relative slidable movement between said mandrel and said first collar, a second collar connected to said mandrel for movement therewith and spaced from said first collar adapted to provide a stop for said first collar, and a shoulder formed on said mandrel spaced above said first collar adapted to engage said first collar on downward movement of said mandrel when said first collar is engaged with said slip arms.

6. A tubing hanger which comprises, in combination, a tubular mandrel adapted to be connected into a tubing string, a cage mounted on said tubular mandrel, releasable connecting means comprising a slot and a lug connecting said cage to said tubular mandrel for limited movement of said tubular mandrel relative to said cage, drag bars on said cage for holding said cage against movement with respect to said tubular mandrel, pipe slips arranged on said cage for engagement with the inner wall of a casing, slip arms connected to said slips and to said cage, said slip arms being provided with a cam surface, biasing means normally urging said pipe slips into a retracted position, a first collar arranged on said mandrel apart from said cage having a cam surface engageable with the cam surface on the slip arms for expanding said pipe slips into engagement with the inner wall of said casing on upward movement of said tubular mandrel, frangible pins connecting said mandrel and said first collar adapted to fracture on upward movement of said mandrel to permit relative slidable movement between said mandrel and said first collar, a second collar connected to said mandrel for movement therewith and spaced from said first collar adapted to provide a stop for said first collar, and a shoulder formed on said mandrel spaced above said first collar adapted to engage said first collar on downward movement of said mandrel when said first collar is engaged with said slip arms.

7. A tubing hanger which comprises, in combination, a tubular mandrel provided with a recess on an upper end and adapted to be connected into a tubing string, an inner sleeve releasably connected to said tubular mandrel, latch means connected to said sleeve engageable with said recess for holding said hanger in inoperative position when removing said hanger from a well casing, a cage mounted on said inner sleeve and said tubular mandrel, releasable connecting means comprising a slot in said cage and a lug on said inner sleeve connecting said cage to said sleeve and said tubular mandrel for limited movement of said tubular mandrel relative to said cage, drag bars on cage for holding said cage against movement with respect to said tubular mandrel, pipe slips arranged on said cage for engagement with the inner wall of said casing, slip arms connected to said slips and to said cage, said slip arms being provided with a cam surface, a spring embracing said slip arms and normally urging said pipe slips into a retracted position, a first collar arranged on said mandrel spaced from said cage having a cam surface engageable with the cam surface on the slip arms for expanding said pipe slips into engagement with the inner wall of said casing on upward movement of said tubular mandrel, first frangible means connecting said mandrel and said first collar adapted to fracture on upward movement of said mandrel to permit relative slidable movement between said mandrel and said first collar, a second collar connected to said mandrel for movement therewith and spaced from said first collar adapted to provide a stop for said first collar, second frangible means connecting said inner sleeve and said tubular mandrel adapted to fracture on upward movement of said mandrel to permit relative slidable movement between said sleeve and said mandrel, and a shoulder formed on said mandrel spaced above said first collar adapted to engage said first collar upon downward movement of said mandrel when said first collar is engaged with said slip arms.

References Cited in the file of this patent

UNITED STATES PATENTS

| | | |
|---|---|---|
| 2,002,140 | Dillon | May 21, 1935 |
| 2,379,394 | Young | June 26, 1945 |
| 2,400,970 | Baker | May 28, 1946 |

FOREIGN PATENTS

| | | |
|---|---|---|
| 376,753 | France | June 21, 1907 |